United States Patent
Kuo et al.

(10) Patent No.: US 7,937,072 B2
(45) Date of Patent: May 3, 2011

(54) MOBILE PHONE ACCESSING SYSTEM AND RELATED STORAGE DEVICE

(75) Inventors: Tung-Cheng Kuo, Hsin-Chu (TW); Ching-Sung Yang, Hsinchu (TW); Ruei-Ling Lin, Hsinchu County (TW); Cheng-Jye Liu, Taoyuan County (TW)

(73) Assignee: Powerflash Technology Corporation, Science Park, Hsinchu (TW)

( * ) Notice: Subject to any disclaimer, the term of this patent is extended or adjusted under 35 U.S.C. 154(b) by 388 days.

(21) Appl. No.: 12/342,082

(22) Filed: Dec. 23, 2008

(65) Prior Publication Data

US 2009/0270071 A1   Oct. 29, 2009

Related U.S. Application Data

(60) Provisional application No. 61/047,428, filed on Apr. 24, 2008.

(51) Int. Cl.
*H04M 1/66* (2006.01)
*H04M 3/16* (2006.01)
*H04M 1/68* (2006.01)

(52) U.S. Cl. ............... 455/411; 455/410; 455/422.1

(58) Field of Classification Search .................. None
See application file for complete search history.

(56) References Cited

U.S. PATENT DOCUMENTS

| 6,792,278 B1 * | 9/2004 | Ahmavaara et al. | 455/461 |
| 2004/0111616 A1 * | 6/2004 | Adi | 713/176 |
| 2006/0129848 A1 * | 6/2006 | Paksoy et al. | 713/193 |
| 2009/0055656 A1 * | 2/2009 | Mersh | 713/187 |
| 2009/0239575 A1 * | 9/2009 | Fu | 455/552.1 |

FOREIGN PATENT DOCUMENTS

| CN | 1764299 A | 4/2006 |
| CN | 1949194 A | 4/2007 |

* cited by examiner

*Primary Examiner* — Ajit Patel
(74) *Attorney, Agent, or Firm* — Winston Hsu; Scott Margo

(57) ABSTRACT

The present invention provides a mobile phone accessing system. The mobile phone accessing system comprises: a mobile phone having a first International Mobile Equipment Identity (IMEI) code; and a storage device comprising a first storage region for storing data, a second storage region for storing a second IMEI code, and a controller coupled to the first storage region and the second storage region for executing a security check function to determine whether the mobile phone is qualified to access the first storage region according to the first IMEI code.

7 Claims, 2 Drawing Sheets

MOBILE PHONE ACCESSING SYSTEM AND RELATED STORAGE DEVICE

CROSS REFERENCE TO RELATED APPLICATIONS

This application claims the benefit of U.S. provisional application No. 61/047,428, which was filed on Apr. 24, 2008 and is included herein by reference.

BACKGROUND OF THE INVENTION

1. Field of the Invention

The present invention relates to a mobile phone accessing system and related storage device, and more particularly to a mobile phone accessing system and related storage device that perform security checking and setup functions through a hardware method.

2. Description of the Prior Art

In the field of data storage, a portable memory device, such as a multimedia card (MMC), compact flash (CF) card, or other type of memory card, is one of the most popular devices utilized to transfer data between different mobile phones. However, the data stored in the portable memory device could be easily accessed by an unauthorized person if the portable memory device is lost. Therefore, conventionally, a software security protection method is adopted to protect the data stored in the portable memory device from being stolen. The software security protection method sets a code to be stored in the portable memory device when the portable memory device is first used. Then, the code should be entered manually to the portable memory device and verified every time the portable memory device is accessed. This constant verification is inconvenient when the user needs to access the data stored in the potable memory device at a high frequency. Furthermore, the code may easily be decrypted by other persons when the software security protection method is utilized to protect the data stored in the portable memory device. Therefore, providing an efficient and convenient security checking method for a portable memory device is a significant concern in the data storage industry field.

SUMMARY OF THE INVENTION

One of the objectives of the present invention is to provide a mobile phone accessing system and related storage device that performs security checking and setup functions through a hardware method.

According to an embodiment of the present invention, a mobile phone accessing system is disclosed. The mobile phone accessing system comprises a mobile phone and a storage device. The mobile phone has a first International Mobile Equipment Identity (IMEI) code, and the storage device comprises a first storage region, a second storage region, and a controller. The first storage region is utilized for storing data. The second storage region stores a second IMEI code. The controller couples to the first storage region and the second storage region for executing a security checking function to determine whether the mobile phone is qualified to access the first storage region according to the first IMEI code.

According to an embodiment of the present invention, a storage device is disclosed. The storage device comprises a first storage region, a second storage region, and a controller. The first storage region is utilized for storing data. The second storage region stores an IMEI code. The controller couples to the first storage region and the second storage region for controlling data accessing operation of the first storage region according to the IMEI code.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
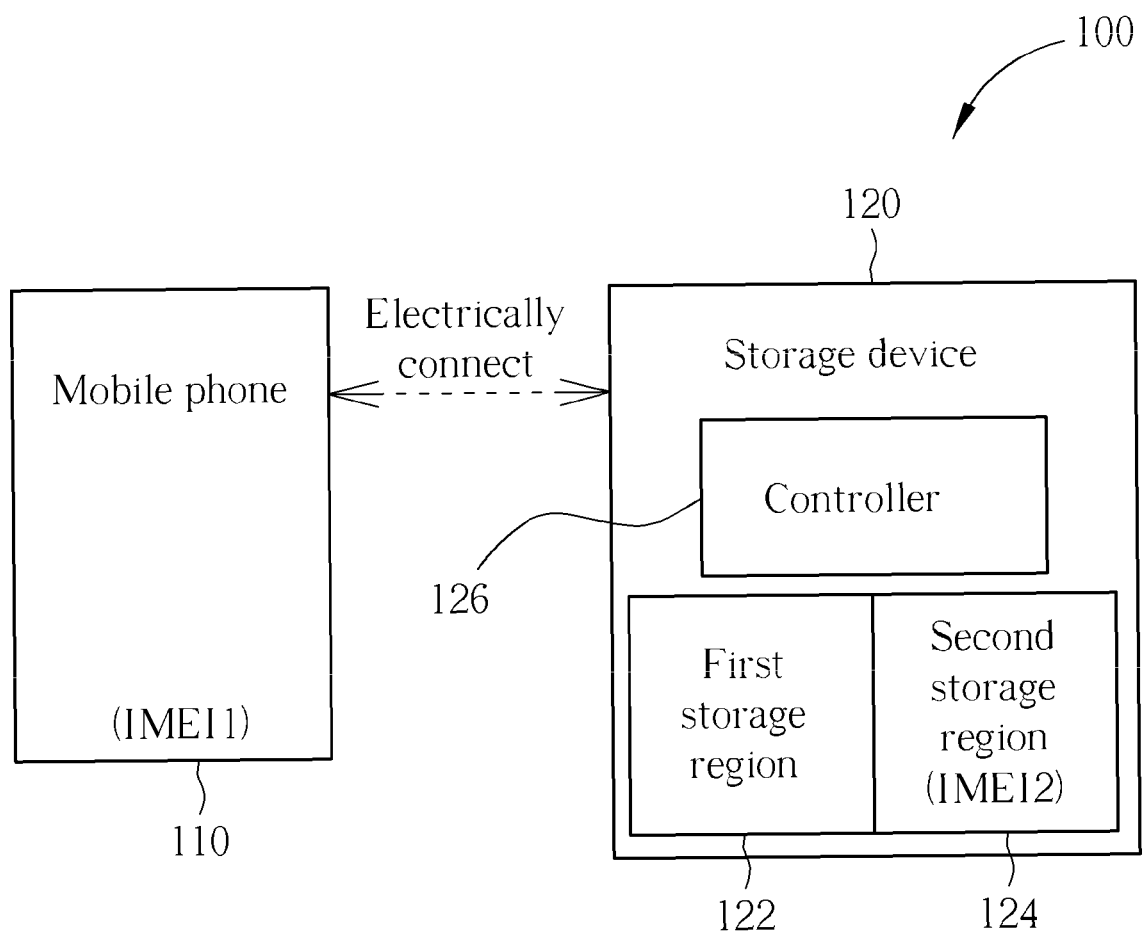
FIG. 1 is a diagram illustrating a mobile phone accessing system according to an embodiment of the present invention.

Please refer to FIG. 1. FIG. 1 is a diagram illustrating a mobile phone accessing system 100 according to an embodiment of the present invention. The mobile phone accessing system 100 comprises a mobile phone 110 and a storage device 120. The mobile phone 110 comprises a first International Mobile Equipment Identity (IMEI) code IMEI1. The storage device 120 comprises a first storage region 122, a second storage region 124, and a controller 126. The first storage region 122 is utilized for storing data, the second storage region 124 stores a second IMEI code IMEI2, and the controller 126 couples to the first storage region 122 and the second storage region 124 for executing a security check function program according to the first IMEI code IMEI1 to determine whether the mobile phone 110 is qualified to access the first storage region 122. Please note that, according to the embodiment of the present invention, the storage device 120 can be implemented by a portable memory device, such as a NAND flash memory, but this is not meant to be a limitation of the present invention. In other words, any kinds of portable memory device belong to the scope of the present invention. Therefore, the present invention does not limit the format of data stored in the storage device 120.

Figure 2:
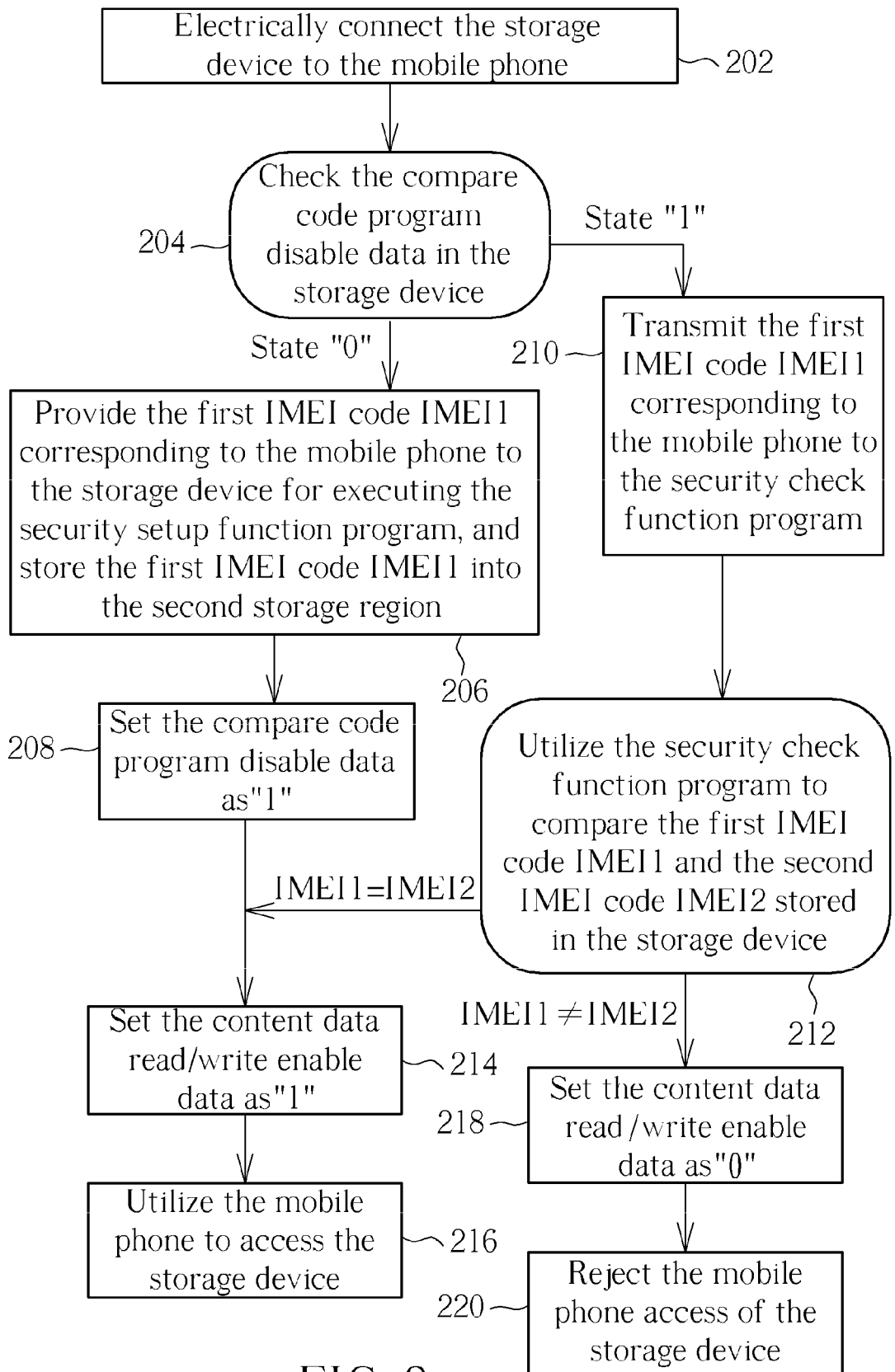
FIG. 2 is a flowchart illustrating a security accessing method performed upon a storage device by a mobile phone according to an embodiment of the present invention.

According to the embodiment of the present invention, in order to avoid the data stored in the storage device 110 being read by unauthorized persons when the storage device 110 is lost, the storage device 120 is assigned by a specific mobile phone 110 when the storage device 120 is first used by the specific mobile phone 110, which means that the storage device 120 is set to only allow access by the specific mobile phone 110. As well as the security check function program, the storage device 120 of the embodiment of the present invention further stores a security setup function program, a content data read/write enable data, and a compare code program disable data. Please refer to FIG. 2. FIG. 2 is a flowchart illustrating a security accessing method performed upon the storage device 120 by the mobile phone 110 according to an embodiment of the present invention. Provided that substantially the same result is achieved, the Steps of the flowchart shown in FIG. 2 need not be in the exact order shown and need not be contiguous, that is, other Steps can be intermediate. The security accessing method comprises:

Step 202: electrically connect the storage device 120 to the mobile phone 110.

Step 204: check the compare code program disable data in the storage device 120; if the state of the compare code program disable data is "0", go to Step 206, if the state of the compare code program disable data is "1", go to Step 210.

Step 206: provide the first IMEI code IMEI1 corresponding to the mobile phone 110 to the storage device 120 for executing the security setup function program, and store the first IMEI code IMEI1 into the second storage region 124.

Step 208: set the compare code program disable data as "1", go to Step 214.

Step 210: transmit the first IMEI code IMEI1 corresponding to the mobile phone 110 to the security check function program.

Step 212: utilize the security check function program to compare the first IMEI code IMEI1 and the second IMEI code IMEI2 stored in the storage device 120; if the first IMEI code IMEI1 is the same as the second IMEI code IMEI2, go to Step 214, if the first IMEI code IMEI1 is different from the second IMEI code IMEI2, go to Step 218.

Step 214: set the content data read/write enable data as "1".

Step 216: utilize the mobile phone 110 to access the storage device 120.

Step 218: set the content data read/write enable data as "0";

Step 216: reject the mobile phone 110 access of the storage device 120.

Therefore, when the storage device 120 is electrically connected to the mobile phone 110 (Step 202), the mobile phone 110 first checks the state of the compare code program disable data in the storage device 120, in which the state of the compare code program disable data shows if the storage device 120 has already been used or has not been used yet. Therefore, when the state of the compare code program disable data is "0" (Step 204), this indicates that the storage device 120 has not been used before, and thus the mobile phone 110 transmits the first IMEI code IMEI1 corresponding to the mobile phone 110 to the storage device 120, and stores the first IMEI code IMEI1 into the second storage region 124 of the storage device 120. Then, the controller 126 of the storage device 120 uses the first IMEI code IMEI1 to execute the security setup function program. In other words, the security setup function program is executed only when the storage device 120 is electrically connected to the mobile phone 110 for the first time.

Since there is only one specific IMEI code that corresponds to a mobile phone, the storage device 120 only recognizes the mobile phone 110 after the first IMEI code IMEI1 is stored into the storage device 120. In other words, the storage device 120 can only be accessed by the mobile phone 110. Then, the security setup function program sets the compare code program disable data of the storage device 120 to be "1". According to the embodiment of the present invention, the first IMEI code IMEI1 stored in the second storage region 124 of the storage device 120 can no longer be changed when the compare code program disable data of the storage device 120 is set to "1" (Step 208). In other words, the second storage region 124 of the storage device 120 can only be written to once. After that, only the mobile phone 110 corresponding to the first IMEI code is allowed to access the storage device 120.

On the other hand, in Step 204, when the state of the compare code program disable data is "1", this indicates that the storage device 120 has been used before. To determine whether the storage device 120 can be accessed by the mobile phone 110, the mobile phone 110 transmits the first IMEI code IMEI1 corresponding to the mobile phone 110 to the storage device 120 (Step 210) and stores it in the second storage region 124. Then the controller 126 of the storage device 120 reads the first IMEI code IMEI1 for executing the security check function program. The security check function program compares the first IMEI code IMEI1 and the second IMEI code IMEI2 to generate a comparison result.

Then, in accordance with the comparison result generated by the security check function program, when the first IMEI code IMEI1 is the same as the second IMEI code IMEI2, this means that the storage device 120 has been assigned for the mobile phone 110. Then, the controller 126 of the storage device 120 sets the content data read/write enable data as "1" (Step 214). Consequently, when the mobile phone 110 detects the content data read/write enable data is "1", the mobile phone 110 determines that the storage device 120 can be accessed normally by the mobile phone 110 (Step 216). On the other hand, when the first IMEI code IMEI1 is different from the second IMEI code IMEI2, this means that the storage device 120 is not assigned for the mobile phone 110. In this case, the controller 126 of the storage device 120 sets the content data read/write enable data as "0" (Step 218). Consequently, when the mobile phone 110 detects the content data read/write enable data is "0", the mobile phone 110 determines that the storage device 120 cannot be accessed by the mobile phone 110 (Step 220), and quits access of the storage device 120.

To sum up, the present invention utilizes a hardware method to implement a security check function upon the storage device 120, and the present invention not only provides a high speed security checking between the storage device 120 and the mobile phone 110, but further provides a safer and low-cost security solution between the mobile phone and the storage device.

Please note that those skilled in this art may be able to apply the present invention in similar fields after reading the disclosed operation and method of the present invention, and this also belongs to the scope of the present invention. In addition, those skilled in the field of electronic circuit design are also capable of implementing the security checking function and the security setup function of the present invention through the technique of electronic circuit design after reading the disclosed operation of the present invention, and this also belongs to the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile phone accessing system, comprising:
   a mobile phone, having a first International Mobile Equipment Identity (IMEI) code; and
   a storage device, comprising:
      a first storage region, for storing data;
      a second storage region, for storing a second IMEI code; and
      a controller, coupled to the first storage region and the second storage region, for executing a security checking function to determine whether the mobile phone is qualified to access the first storage region according to the first IMEI code, wherein when the storage device is electrically connected to the mobile phone and when the second storage region of the storage device has not been written to, the controller further executes a security setup function to receive the first IMEI code from the mobile phone, and writes the first IMEI code into the second storage region to be the second IMEI code.

2. The mobile phone accessing system of claim 1, wherein the storage device executes the security setup function only when the storage device is electrically connected to the mobile phone for a first time.

3. The mobile phone accessing system of claim 1, wherein when the storage device is electrically connected to the mobile phone, the storage device executes the security checking function for comparing the first IMEI code and the second IMEI code to generate a comparison result, and determines whether the second storage region can be accessed by the mobile phone according to the comparison result.

4. The mobile phone accessing system of claim 3, wherein when the comparison result indicates that the first IMEI code is similar to the second IMEI code, the storage device allows the mobile phone to access the second storage region.

5. The mobile phone accessing system of claim 1, wherein the second storage region of the storage device is only allowed to be written to once.

6. The mobile phone accessing system of claim 1, wherein the storage device is a portable storage device.

7. The mobile phone accessing system of claim 6, wherein the portable storage device is a portable memory device.

* * * * *